US007856450B2

(12) United States Patent
Allerton et al.

(10) Patent No.: US 7,856,450 B2
(45) Date of Patent: Dec. 21, 2010

(54) APPARATUS AND METHOD FOR DISTRIBUTING INFORMATION BETWEEN BUSINESS INTELLIGENCE SYSTEMS

(75) Inventors: Mark William Allerton, Vancouver (CA); Stephan Jacob Nagoski, Vancouver (CA); Carlos Antonio Mejia, Vancouver (CA); Travis Downs, Vancouver (CA); Cynthia Tze Mynn Lim, Vancouver (CA)

(73) Assignee: Business Objects Software Ltd., Dublin (IE)

(*) Notice: Subject to any disclaimer, the term of this patent is extended or adjusted under 35 U.S.C. 154(b) by 471 days.

(21) Appl. No.: 11/612,416

(22) Filed: Dec. 18, 2006

(65) Prior Publication Data

US 2008/0147720 A1   Jun. 19, 2008

(51) Int. Cl.
*G06F 17/00* (2006.01)
(52) U.S. Cl. ........................ 707/791; 707/801; 707/822; 707/828
(58) Field of Classification Search .......... 707/600–831
See application file for complete search history.

(56) References Cited

U.S. PATENT DOCUMENTS

| | | | |
|---|---|---|---|
| 6,016,393 A | 1/2000 | White et al. | |
| 6,070,191 A | 5/2000 | Narendran et al. | |
| 6,334,139 B1* | 12/2001 | Sakakura | 709/202 |
| RE37,722 E | 5/2002 | Burnard et al. | |
| 6,482,737 B2 | 1/2005 | Stiles | |
| 6,686,169 B2 | 4/2005 | Wei | |
| 7,080,092 B2 | 7/2006 | Upton | |
| 2002/0156792 A1 | 10/2002 | Gombocz et al. | |
| 2003/0204487 A1 | 10/2003 | Sssv et al. | |
| 2003/0229618 A1 | 12/2003 | Judy | |
| 2004/0015908 A1 | 1/2004 | Giel et al. | |
| 2004/0047354 A1 | 3/2004 | Slater et al. | |
| 2005/0027712 A1 | 2/2005 | Gargi et al. | |
| 2005/0188354 A1 | 8/2005 | Finocchio | |
| 2006/0212474 A1 | 9/2006 | McCormack et al. | |
| 2006/0294153 A1 | 12/2006 | Kumar et al. | |

FOREIGN PATENT DOCUMENTS

WO   WO2005/089217   9/2005

OTHER PUBLICATIONS

Lucas et al., "Special Edition Using Crystal Enterprise 8.5". Overview, Safari Books Online. 27 pp. (Jan. 20, 2009).

Elmasri et al. "Fundamentals of Database Systems." 2d Ed. Addison-Wesley Pub. Co., Menlo Park, CA, (1994) pp. 715-716.

(Continued)

*Primary Examiner*—Isaac M Woo
(74) *Attorney, Agent, or Firm*—Cooley LLP

(57) ABSTRACT

A computer readable storage medium includes executable instructions to define a first information object, where the first information object is operative to perform a first function when associated with a first system, and a second function when associated with a second system. A set of properties for the first information object is defined. The set of properties are divided into a first set of properties for when the first information object is in the first system, and a second set of properties when the first information object is in the second system.

12 Claims, 6 Drawing Sheets

OTHER PUBLICATIONS

Oracle 9*i* Reports Building Reports, Release 9.0, ORACLE, 69 pp. (Oct. 2002).

Oracle 9*i*AS Reports Services: Publishing Reports to the Web, Release 9.0, ORACLE, 9 pp. ORACLE, (Feb. 2002).

Blanton, "Microsoft Computer Dictionary". 5$^{th}$ Ed., Microsoft Press, pp. 182 and 409 (Jan. 2002).

Oracle 9*i* Application Server: Oracle Reports. ORACLE, 21 pp. (Feb. 2001).

Bouguettaya, et al., "Supporting Dynamic Interactions Among Web-Based Information Sources." IEEE Transactions vol. 12 No. 5 (Sep.-Oct. 2000).

PCT/CA2005/001524, Business Objects S.A., International Search Report and Written Opinion (Jan. 30, 2006).

* cited by examiner

APPARATUS AND METHOD FOR DISTRIBUTING INFORMATION BETWEEN BUSINESS INTELLIGENCE SYSTEMS

CROSS REFERENCE TO RELATED APPLICATIONS

This application is related to the following pending, commonly owned U.S. patent applications, each of which is incorporated herein by reference in its entirety, Ser. No. 11/241,773 filed Sep. 20, 2005, entitled "Apparatus and Method for Report Publication in a Federated Cluster" and Ser. No. 11/303,039 filed Dec. 14, 2005, entitled "Apparatus and Method for Transporting Business Intelligence Objects between Business Intelligence Systems".

BRIEF DESCRIPTION OF THE INVENTION

This invention relates generally to facilitating the analysis of data to help individuals make better organizational decisions. More particularly, this invention relates to apparatus and techniques for performing these activities on systems distributed across multiple sites or on systems with changing configurations.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems such as relational databases or On Line Analytic Processing (OLAP) systems used to collect, store, and manage raw data.

In recent years, BI tools have permeated business information systems to the point where the reliability, scalability, and flexibility of BI tools directly impacts the operational efficiency of enterprise business processes. Business users expect Quick access to a wide variety of customized BI tools that provide a rich feature set. This creates a need for locally developed BI tools that are executed against local data sources. This leads to users demanding local BI systems.

At the same time, organizations require some uniformity in decision making. This is a challenge when an organization spans multiple sites. Local system evolution, if not controlled, creates data and tool versioning problems. There is a need for bi-directional communication of both data and BI tools to address these problems. However, there is also a need to eliminate setup time for BI applications or the elements that support a BI activity ported between sites.

In view of the foregoing, it would be highly advantageous to provide improved cluster technology. In particular, it would be highly advantageous to provide an improved cluster technology for the efficient distribution of BI tools and data.

SUMMARY OF INVENTION

The invention includes a computer readable storage medium with executable instructions to receive a system aware information object at a system. A property of the system aware information object is interpreted based on a specification associated with the system aware information object. A value is assigned to the property such that the system aware information object is operative in a manner specified by the value.

The invention also includes a computer readable storage medium with executable instructions to define a first information object, where the first information object is operative to perform a first function when associated with a first system, and a second function when associated with a second system. A set of properties for the first information object is defined. The set of properties are divided into a first set of properties for when the first information object is in the first system, and a second set of properties when the first information object is in the second system.

BRIEF DESCRIPTION OF THE FIGURES

The invention is more fully appreciated in connection with the following detailed description taken in conjunction with the accompanying drawings in which.

Like reference numerals refer to corresponding parts throughout the several views of the drawings.

DETAILED DESCRIPTION OF THE INVENTION

Figure 1:
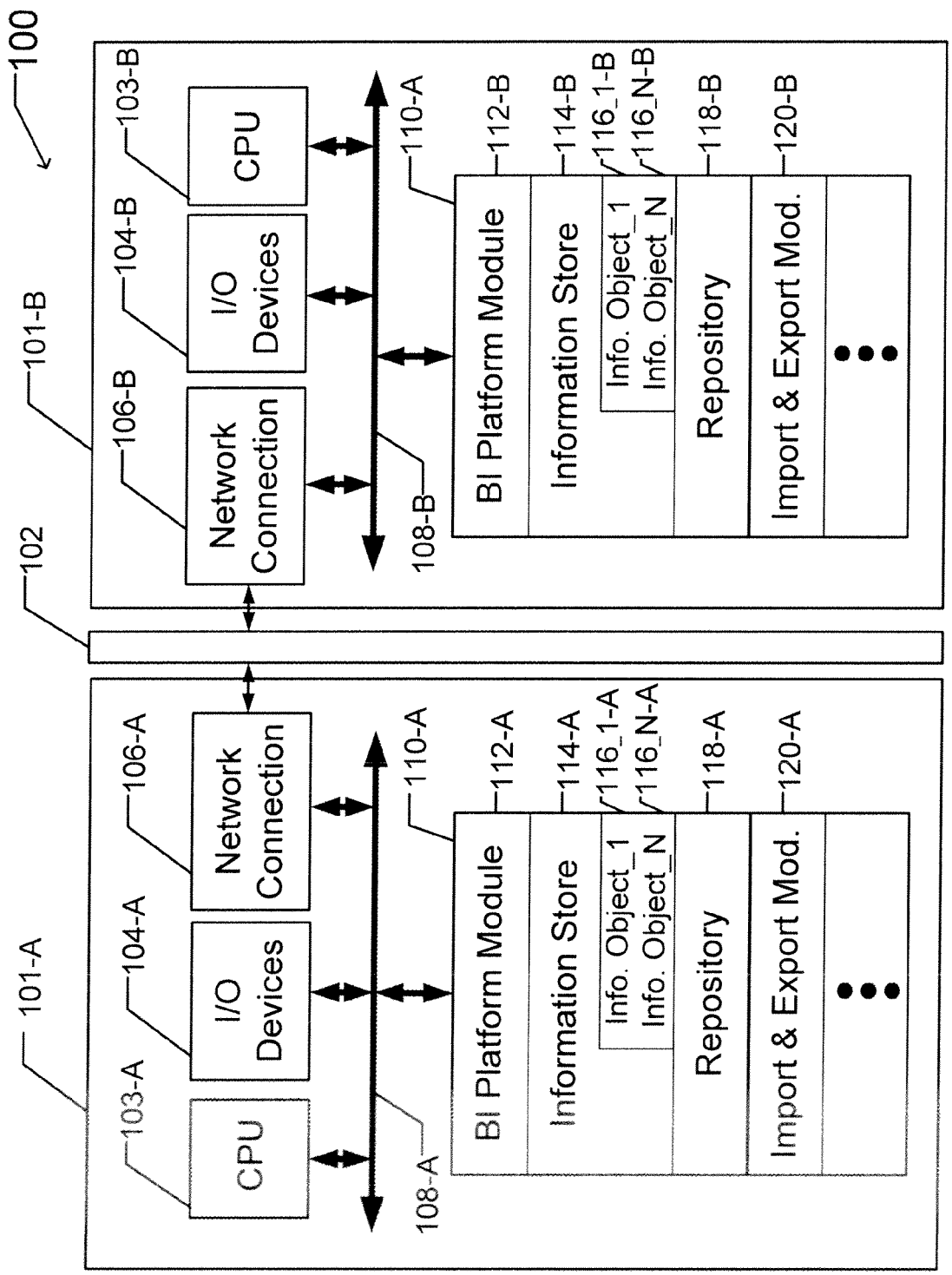
FIG. 1 illustrates a system including two coupled computers in accordance with an embodiment of the invention.

Some embodiments of the invention make use of information objects. Information objects, also called BI objects or component objects, are elements of data, metadata and instructions managed by the BI system. An information object represents items associated with and included in a BI system. In an embodiment, these information objects are included in a collection of information objects and associated items to define a BI tool, BI subject or support a BI activity. For example, a collection of information objects controlling document creation and viewing may include a document component object, a metadata layer information object, a connection information object, and the folders and security model around those components. In contrast, a data source, like a database, would not be included as it is not managed by the BI system explicitly. However a connection or a generic representation of a data source embodied in an information object would be. By way of example, various types of information objects may be utilized in accordance with the invention, including:

user object—specifying a user
user group object—specifying a user group
connections object—representing connections to a data source
local data source object—representing a local data source metadata layer object—representing a metadata layer overlying a data source dynamic cascading prompt object—characterizing user prompts in a user interface scheduled object—representing information about a scheduled activity alert object—characterizing an alert glossary term object—representing a glossary term for an encyclopedia application logon session object—representing information about a user logon session relationship object—governing how objects relate to each other application object—characterizing a BI application report object—representing information about a report analytic object—representing information about an analytic application filter object—characterizing a filter for a BI tool file object—representing information about a file folder object—representing information about a folder In an embodiment, one or more information objects are configured such that the information objects operate in a system aware manner. In an embodiment, a collection of information objects including one or more system aware information objects operate in a system aware manner. That is, the collection of information objects is operative with a first function in a first BI system and with a second function in a second BI system.

Geographically or otherwise segmented BI systems are referred to as sites. An example of a group of sites includes a BI system for each office in a company. Another example is a BI system for each division of a company. A further example is test and production sites. These sites can be referred to as home and remote sites or hub and spoke sites. A collection of information objects has a home site where it is managed. Changes to security and content, and any other management activities, are typically done at the home site. A site administrator for a remote site requests one or more system aware information objects to be distributed from the home site to the remote site.

FIG. 1 illustrates a system 100 configured in accordance with an embodiment of the invention. The system 100 includes two or more coupled computers, e.g. arranged in a networked architecture. The system 100 includes a first computer 101-A and a second computer 101-B. A data signal can be sent from the first computer to the second computer and vice versa via communication channel 102, which may be any wired or wireless channel Each computer 101 includes a central processing unit 103 connected to a set of input/output devices 104 and a network connection circuit 106 via a bus 108. As shown in FIG. 1, computer 101-A includes a CPU 103-A, input/output devices 104-A, a network connection circuit 106-A and a bus 108-A, while computer 101-B includes a CPU 103-B, input/output devices 104-B, a network connection circuit 106-B and a bus 108-B. For the purpose of simplicity, individual components, e.g., 101-A and 101-B, are collectively referenced only by their number, e.g., 101.

The input/output devices 104 may include standard components, such as a keyboard, mouse, display, printer, and the like. The network connection circuit 106 provides connectivity to communication channel 102. Also connected to the bus 108 is a memory 110. The memory 110 stores executable instructions to implement operations of the invention. In an embodiment, the memory 110 stores one or more of the following modules: BI platform module 112, an information store 114, which stores information objects 116_1 through 116_N, a repository module 118 and an import and export module 120.

The BI platform module 112 includes executable instructions to perform BI related functions on computers 101-A or 101-B, across system 100 or a wider network. BI related functions include: generating reports (locally or remotely), distributing reports, viewing a report, performing query and analysis, and the like. In an embodiment, the BI platform module 112 can include sub-modules, such as a report module, a server module, a communications module and the like. In an embodiment, the BI platform module 112 includes executable instructions to define report management architecture. By way of example, the BI platform module 112 may be BusinessObjects Enterprise, sold by Business Objects Americas, Inc., San Jose, Calif. The BI platform module 112 can include a schedule information interface. A schedule information interface is implemented if an information object is to be schedulable. For example, information such as schedule start time, schedule based on calendar, schedule dependency information, and the like are defined.

In an embodiment, the BI platform module 112 includes executable instructions to provide a report publication system. The report publication system has a first set of report management servers defining a first cluster, e.g., several servers running on computer 101-A. A first set of client machines (not shown) are configured to access the first cluster. A second set of report management servers defines a second cluster, e.g., at computer 101-B. Both clusters support a common report management architecture. A second set of client machines are configured to access the second cluster. A first client machine of the first set of client machines invokes a report on the first cluster to form a published report with a designated destination address, e.g., address of the second cluster. The published report is exchanged between the first cluster and the second cluster via channel 102, the Internet and the like. A second client machine of the second set of client machines accesses the published report through the second cluster.

The repository module 118 stores files and other items that are managed by the BI platform module 112. Typically, these files include documents, such as, reports (e.g., Crystal Reports, WebIntelligence Documents), non-report documents (e.g., word processing documents, spreadsheets), files implementing features of the platform (e.g., semantic data layers, data sources), and the like. In an embodiment, each of these files has a corresponding information object. However, not every information object has an associated file. In an embodiment, the memory 110 does not include an information store 114 nor information objects 116_1 through 116_N and the role of information objects is handled by the files in the repository module 118.

The import and export module 120 includes executable instructions to create a export file that includes one or more information objects and the items they represent or characterize. The export entity further includes data that defines attributes and relationships associated with the one or more information objects. In an embodiment, a first export entity including an information object and a second export entity including the item the information object represents are combined into a composite export entity. The composite export entity is distributed. The import and export module 120 includes executable instructions to import an export entity, unpack the entity and store its constituent parts (e.g., information objects, files) in BI system. The import and export module 120 may be implemented in accordance with any number of techniques including those described in the previously cited pending, commonly owned patent applications.

The modules stored in memory 110 are exemplary. Additional modules such as an operating system can be included. It should be appreciated that the functions of the presented modules may be combined. In addition, a function of a module need not be performed on a single machine, e.g., the first computer or the second computer. Instead, the function may be distributed across system 100 or a wider network, if desired. In an embodiment of the present invention, the system 100 may operate in a non-networked architecture.

Figure 2:
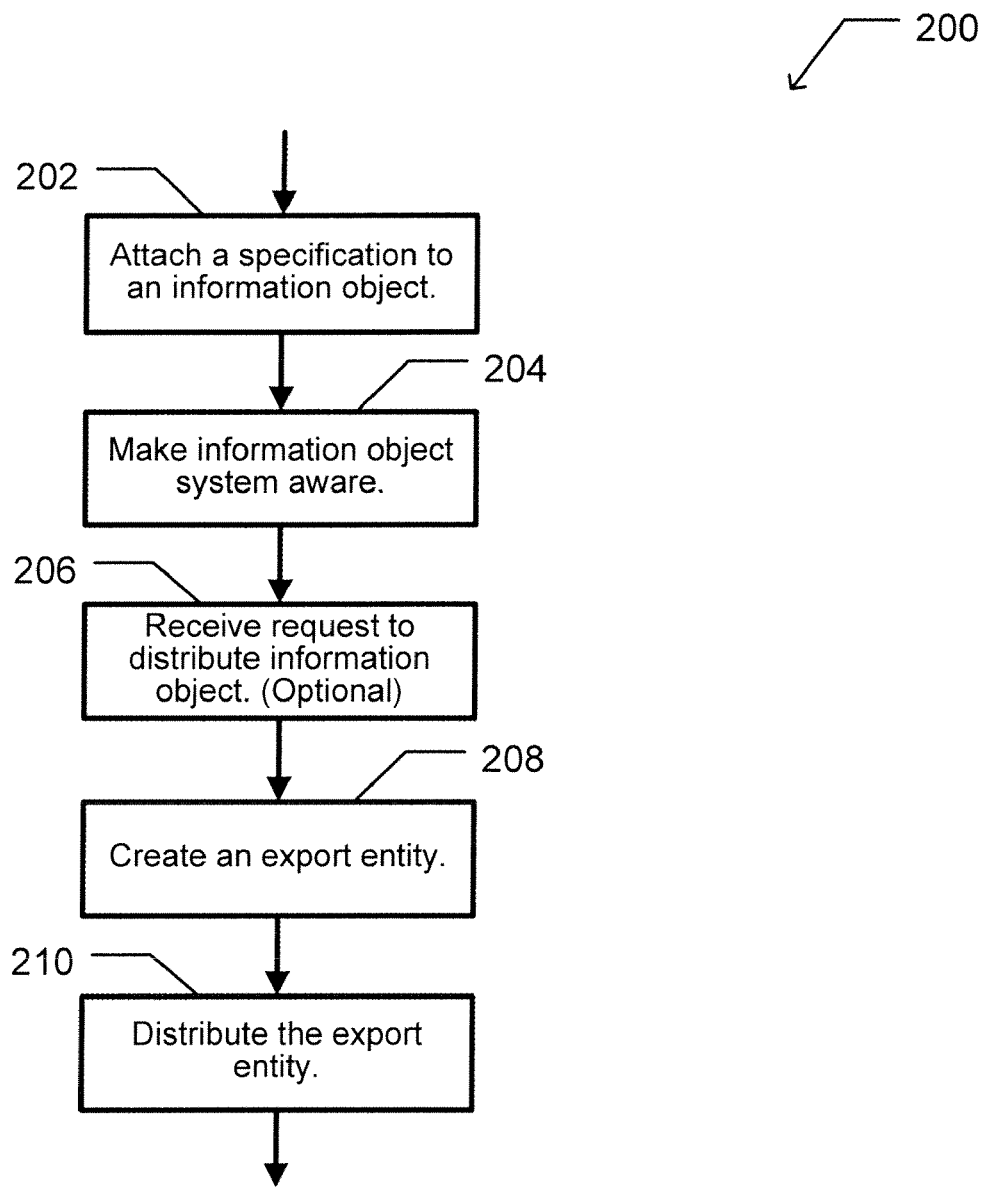
FIG. 2 illustrates processing operations for creating and distributing an information object associated with an embodiment of the invention.
Figure 3:
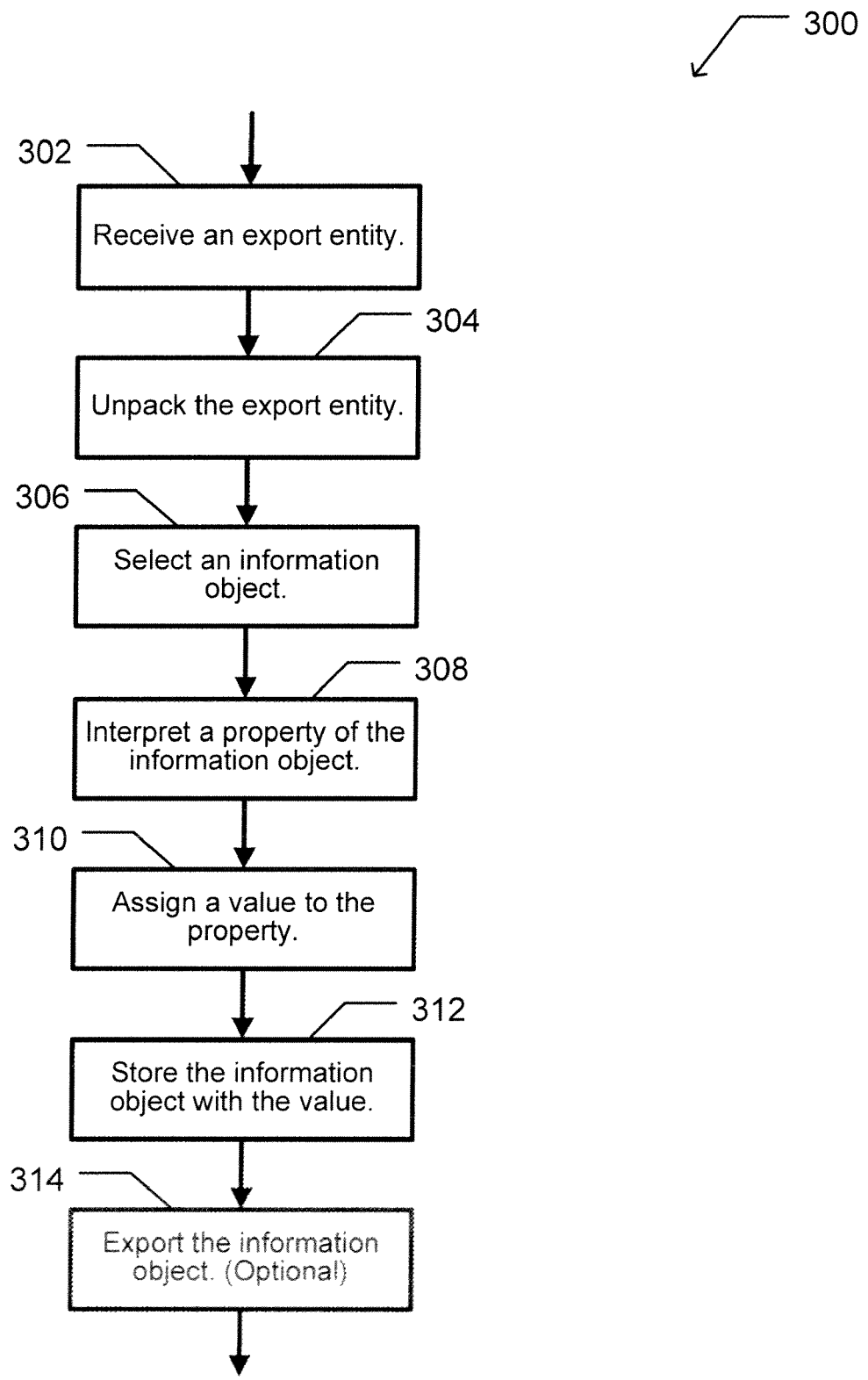
FIG. 3 illustrates processing operations for receiving and storing an information object associated with an embodiment of the invention.
Figure 4:
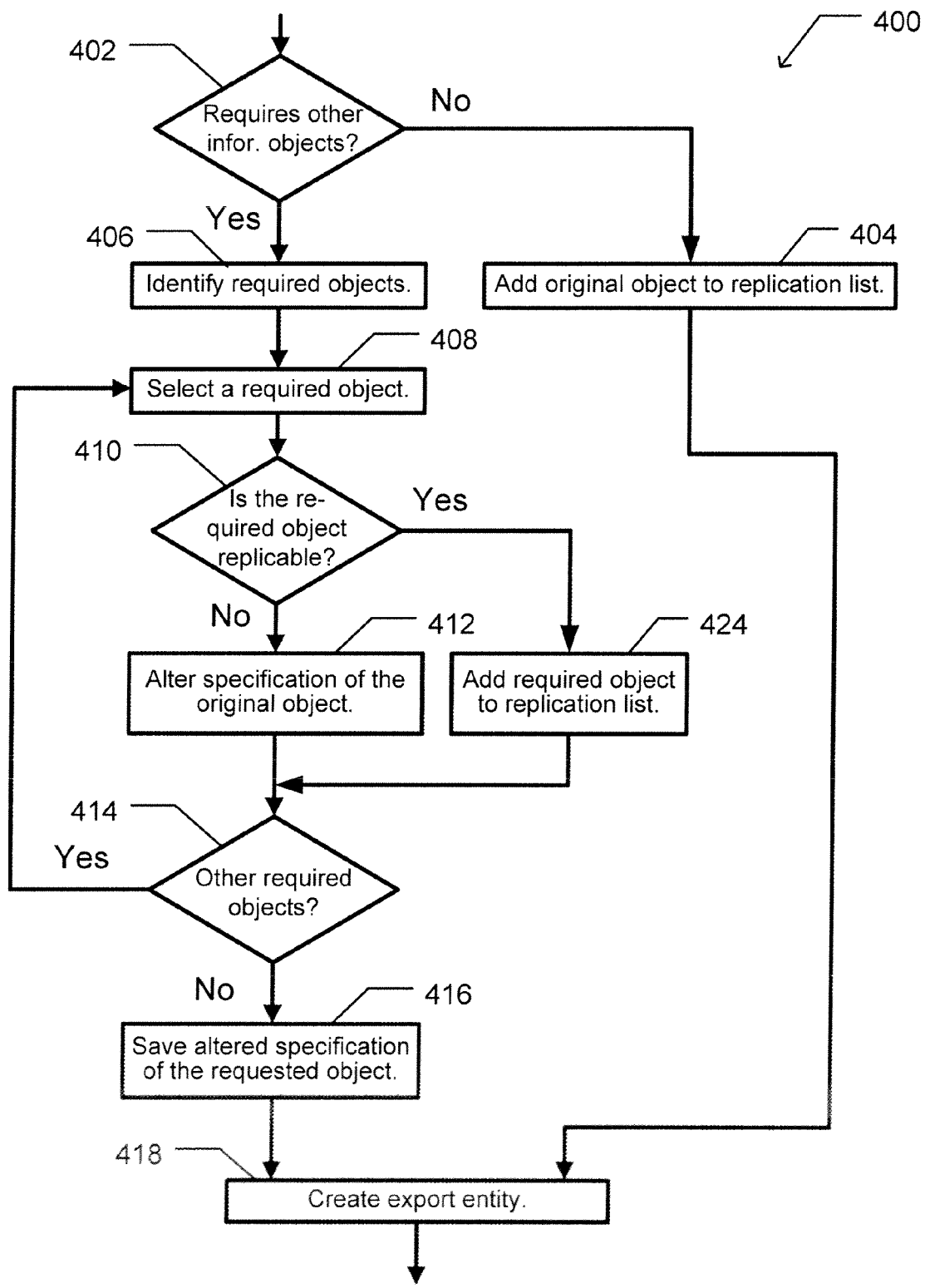
FIG. 4 illustrates processing operations for enabling an information object to be system aware in accordance with an embodiment of the invention.

FIGS. 2-4 illustrates processing operations associated with an embodiment of the invention. FIG. 2 illustrates an example of defining an information object from information store 114, enabling the object for distribution and distributing it per instructions in the BI platform module 112 and import and export module 120. FIG. 3 illustrates an example of receiving, interpreting and storing an information object per instructions in the BI platform module 112 and import and export module 120 FIG. 4 illustrates a set of processing operations for enabling an information object to be system aware for the purposes of distribution, flexible use and the like. The processing operations of FIGS. 2-4 can be included as variety of workflows including the distribution of BI tools and content and operation of BI tools in changing BI systems.

FIG. 2 illustrates a set of processing operations 200 for creating and distributing an information object associated with an embodiment of the invention. One or more information objects exists in a BI system. The BI system attaches a specification to an information object 202. The information object is made system aware 204. Making an information object system aware includes setting a property in the information such that it is replicable or completing the specification of the object. In an embodiment, the specification is completed. In an embodiment, the specification is completed and a replication bit is set.

In an embodiment, executable instructions allow the administrator of the BI system to label information objects as replicable. In an embodiment, there is a special property of an information object "Replicable". Some information objects should not be made replicable, so in an embodiment, there is a "Non-Replicable" property.

An information object can be made system aware in accordance with the invention. That is, the information object has more than one function depending on the system it is included in. In an embodiment, the information object has a first function in a first BI system and a second function in a second BI system. The difference in functions is defined by the specification included in the information object. The specification includes data and logic associated with the system aware information object. The difference in function can include connecting to different data sources, the hierarchy of a collection of information objects, the language that a BI system returns when interacting with an information object and associated item, localized text, formatting and figures, consumption of computing resources, and the like. A change in hierarchy function includes information object relationship that is dependent on the system the information object is included in. In an embodiment, the BI system changes the specification of the system aware information object.

The BI system receives a request to distribute an information object 206. The one or more information objects defined in the request are called the requested information objects. In an embodiment, operation 206 is omitted. An export entity including the requested information objects is created 208. In an embodiment, the export entity includes a copy of the object, attributes and relationships associated with the object, and items associated with the object. The export entity can be for an information object or many information objects, including a collection of information objects.

The information object is exported from the BI system 210. In an embodiment, the information object once exported is stored, e.g., in an archive. In an embodiment, the information object once exported is imported into, and installed in, another BI system, e.g., part of a distribution process. The export entity may be distributed in any number of ways, including the downloading of the export file to the target system, sent by (secure) file transfer protocol, down or up loaded to a web resource, stored on a computer readable medium and physically transported, or the emailing of the export file to the target system. Export entities may be of various types. In an embodiment, the export entity includes an information object and the associated item. In another embodiment, the export entity includes only the information object because the object has no associated item. In yet another embodiment, the export entity includes one or more information objects, while the associated item is reconstructed from the information objects.

FIG. 3 illustrates processing operations for receiving, interpreting and storing information objects associated with an embodiment of the invention. An export entity is received at a BI system 302. The export entity is unpacked, revealing one or more information objects and items 304. An information object is selected from the one or more information objects included in the export entity 306. The BI system interprets the properties of the information object 308. The interpretation of the properties includes evaluating one or more properties of the system aware information object based on a specification associated with the system aware information object. The specification includes data and logic to evaluate the values associated with one or more parameters in an information object. The specification can be used to review, alter, augment or replace a value. An example of values are the IDs of other information objects. If the information object has to be distributed and it has dependencies on other information objects, these other information objects need to be distributed or the specification of the information object is altered. In an embodiment, values in information objects are replaced by placeholders that are evaluated per the specification of the information object. The logic of the specification is designed to replace a placeholder with a value.

The BI system may assign a default value to the value of a property 310. In an embodiment, the BI system queries itself by constructing a query based on one or more parameters included in the specification of the information object. The result of the query is a system specific value that can be assigned to the property. The BI system may assign the ID of another information object as a system specific value to the value of the property by linking metadata associated with the system aware information object to the other information object. One or more report prompts may be system dependent values. That is a master report is created at the hub site and prompt values for that report are fixed at the hub sites. An example of a prompt value is a filter value. In an embodiment, a user group defining certain access levels is created at a hub site and distributed to other sites. The users in the user group varies from site to site.

The BI system stores the information object with the value 312. In an embodiment, processing operations 306 through 312 are repeated for each information object included in the export entity. In an embodiment, the BI system sends the system aware information object to another system 314.

FIG. 4 illustrates a set of processing operations 400 for enabling an information object for distribution in accordance with an embodiment of the invention. The set of processing operations 400 is an example of processing operation 208 from FIG. 2. The processing operations 400 can be part of a set of processing operations where a BI system exports one or more information objects and their associated items. These information objects are called the requested information objects. Indeed in an embodiment, another BI system can request one or more information objects and associated items from the BI system.

The set of processing operations 400 are for a requested information object. The set of operations can be repeated when more information objects are requested. In processing operation 402, the system determines if the requested information object has any dependencies. That is, does the information object require other information objects? If 402-No, the requested information object is added to a replication list 404, because the information object can be distributed without generating a dependency error. If 402-Yes, the required information objects are identified and listed 406.

A required object is selected from the list of required objects 408. This requires object is tested as to whether it is relicable 410. If 410-Yes, then the required object is added to the replication list 424. That is, operations 40)8 through 414 will be performed on the required objects added to the replication list. In an embodiment, at operation 424, a recursive call is made to the set of processing operations 400 with respect to the required object. If 410-No, then the specification of the original requested information object is altered 412. That is, the specification of the requested information object with respect to the instant required object is changed.

The BI system tests to see if there are remaining required objects 414. If 414-Yes, then another required object is selected at operation 408. If 414-No, then the altered specification of the original requested information object is saved 416. At this point the BI system creates an export entity for the requested and required information objects and their associated items 418. In an embodiment, where multiple information objects are requested, one export entity is created and augmented with information objects and items upon each occurrence operation 418 for the given set of requested information objects. One export entity may be created for each requested information object.

Examples of information objects that are replicable and non-replicable vary with embodiments of the invention. An example of a replicable required information object is a sub-report to a requested report. The requested report is the associated item to a requested information object. The requested report includes a sub-report making the sub-report a required item. In an embodiment, the sub-report is replicable. An example of a non-replicable required information object is a data connection to a requested report. The requested report refers to a data connection. In an embodiment, the data connection is non-replicable.

There are a number of ways to alter the specification of the requested information object with respect to a required object in accordance with the invention. Because non-replicable required objects will not be ported with the requested information object, the requested information object needs to be made system aware. Referencing a required object by temporary ID or a relative reference is not an option if the request object has been replicated to another BI system. The ID must be replaced or augmented. In an embodiment, a piece of metadata associated with, and identifying, the required object is included in the specification of the requested information object. This metadata allows the requested object to link to an equivalent required object in another BI system. A query term may be included in the specification of the requested object. The query terms allows the requested object to query another BI system for an equivalent required object. In an embodiment, a default value is given in place of the ID of a required object. In an embodiment, an absolute reference ID of the required object is stored in the requested information object.

Figure 5:
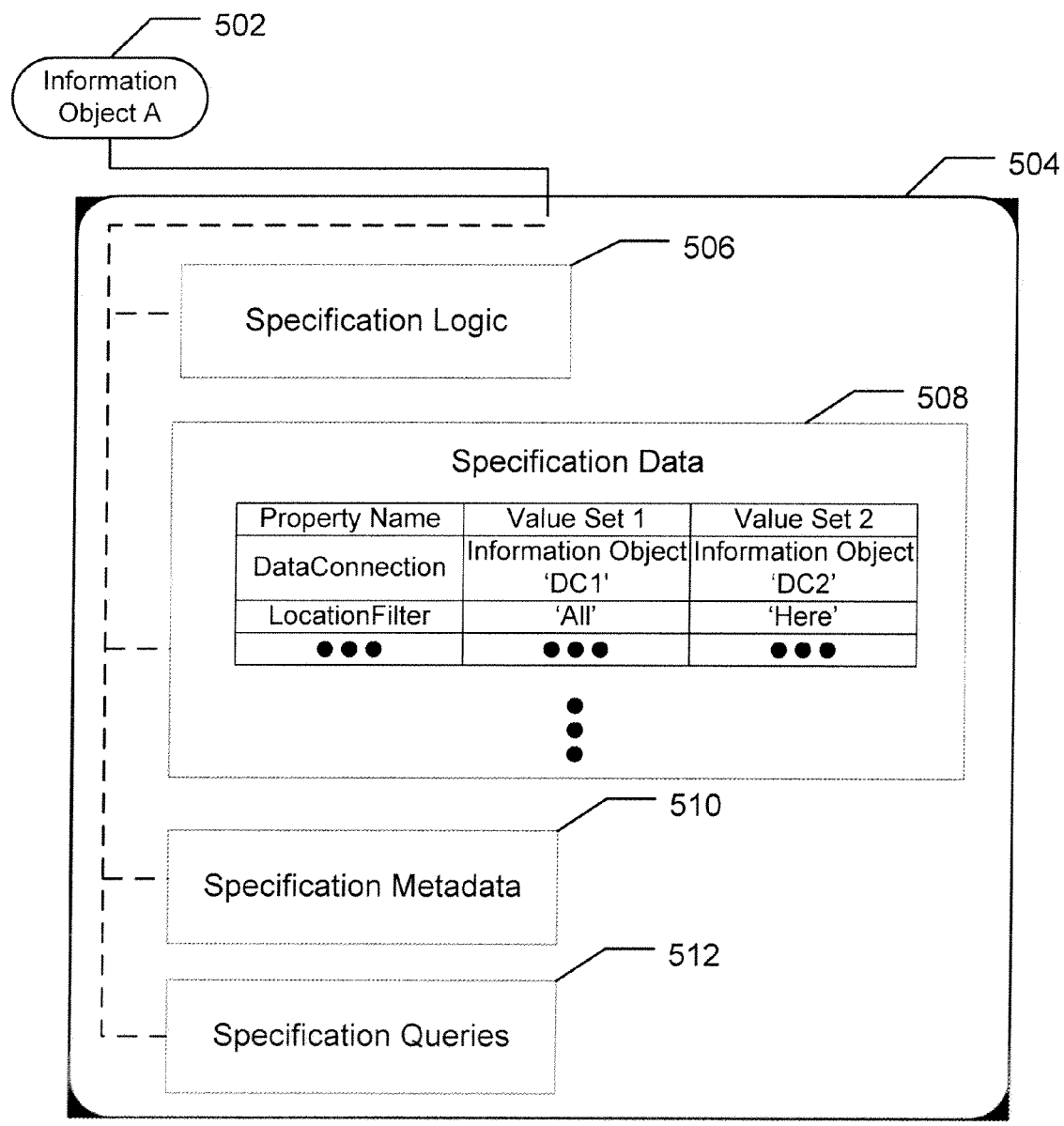
FIG. 5 illustrates an information object and its specification, showing how certain information object properties are altered in view of the specification in accordance with an embodiment of the invention.

FIG. 5 illustrates an information object 502 and its specification 504 showing how certain information object properties are altered in view of the specification in accordance with an embodiment of the invention. Executable instructions in the BI platform module 112 are used to attach a specification 504 to the information object 502. The specification 504 includes logic 506, data 508, metadata 510 and/or queries 512. These are used to evaluate one or more component object property values. In this way, the information object's property values change depending on the system it is included in. Two examples of properties are shown in the data 508. Here the data 508 is shown as a table. The evaluation of properties includes using the value included in the specification data, e.g., "Information Object DC1" and "Information Object DC2" for the "DataConnection" property. The evaluation of properties includes feeding a value in the specifications data into a calculation that includes using the logic 506, metadata 510 and queries 512 included in the specification. As mentioned in the description of FIG. 3, one or more report prompts may be system dependent values. That is, a report (not shown) attached to the information object 502 uses values that are fixed by the site it is deployed in. In data 508 an example of a prompt value is the "LocationFilter" property. This property has two values in the data, under the first data set it is "All", as in filter for all locations. Under the second data set, it is a placeholder value that is the input to a calculation. Here the placeholder is "Here" and in an embodiment, this placeholder is used to generate a query to retrieve a location name to be associated with the "LocationFilter" property.

Figure 6:
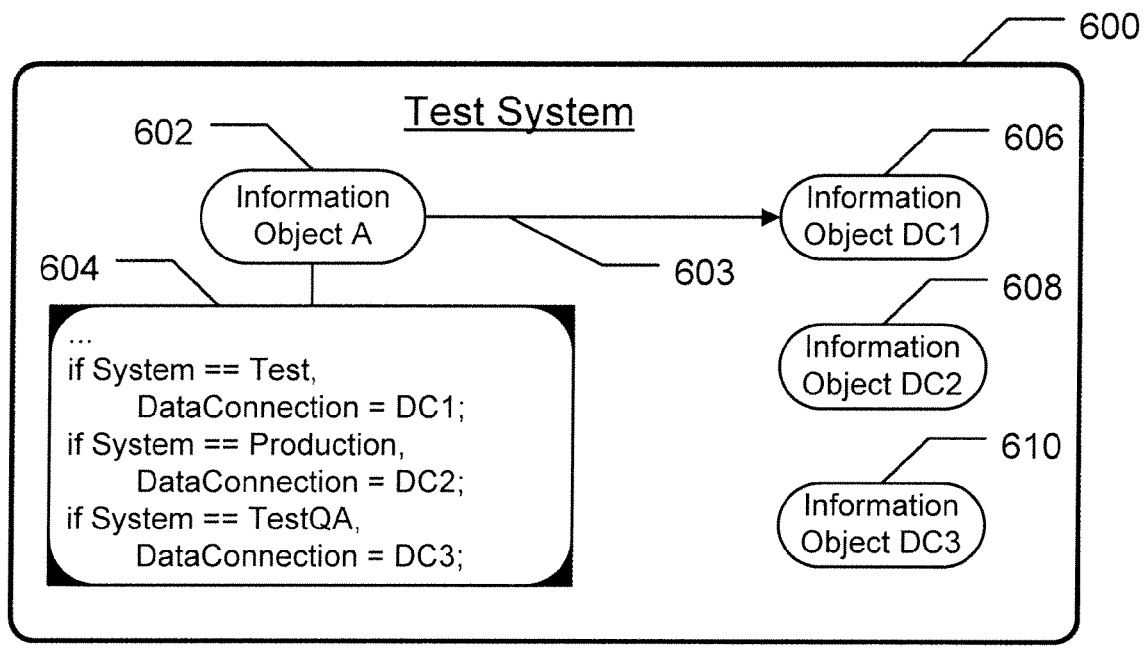
FIG. 6 illustrates a system aware information object with different values for a property in different systems in accordance with an embodiment of the invention.
Figure 6:
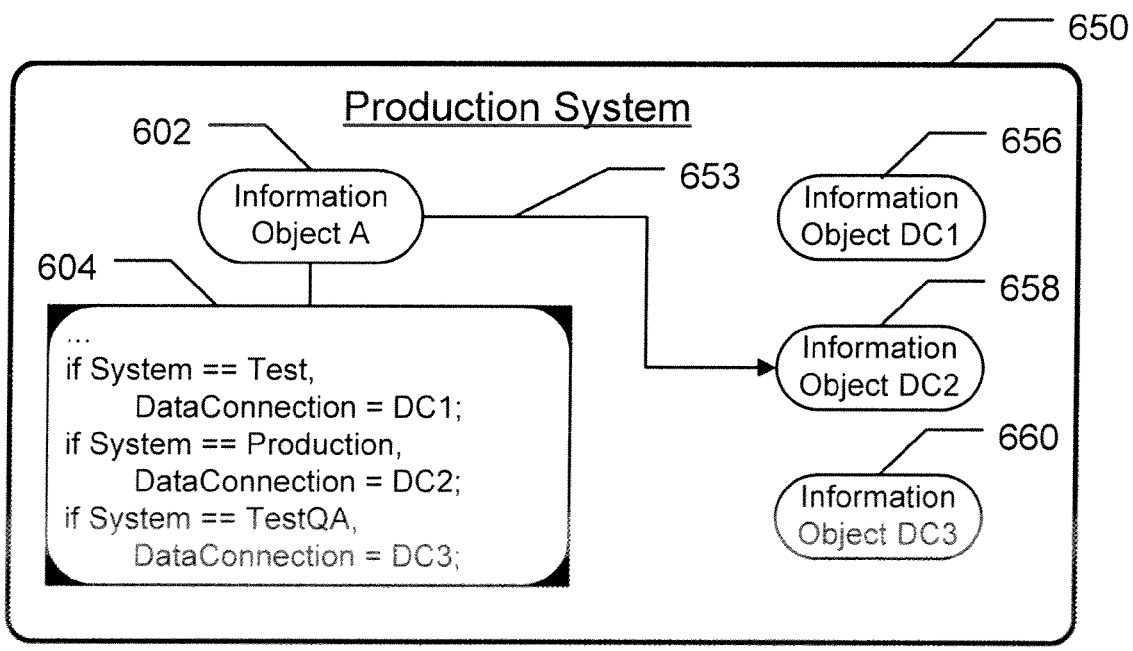

FIG. 6 illustrates a system aware information object 602 with different values for a property in different systems in accordance with an embodiment of the invention. Here the property is an information object reference property represented by link 603. The system aware information object 602 is included in a hierarchy of information objects and because it is system aware, it can choose the information object to which it refers. The information object 602 includes a specification 604 containing data, metadata or logic to evaluate one or more component object IDs in accordance with an information object reference property. In FIG. 6 only the logic is shown. The specification can change the value of the information object reference property based on the system the information object is included in. For example, when the information object A 602 is included in the test system 600 it is linked to the data connection represented by information object DC1 606 per specification 604. When the information object A 602 is included in the production system 650 it is linked via link 653 to a data connection represented by information object DC2 656 per specification 604. In the test system 600 there are three data connections represented by information object DC1 606, information object DC2 608 and information object DC3 610. In the production system 650 there are three data connections represented by: information object DC1 656, information object DC2 658 and information object DC3 660.

The above techniques for implementing system aware information objects support a variety of use cases. These uses cases include site-aware defining and running system aware BI activities, distributing system aware information objects, processing information objects and invoking BI tools in a cluster with a structure that has changed since the creation of the information objects that define the BI tool.

Some embodiments of the present invention support system aware collections of information objects. A BI content creator can create system aware collections of information objects which include one or more system aware information objects. Examples of BI content creators include a BI system administrator, BI system vendor, third party software provider, and the like. A BI content creator designs collections of information objects at a home site or a test site, and then deploys them to another site. If the information objects of the collections of information objects are system aware, they operate in a manner congruent with the local site settings.

Each spoke site contains information about its settings that the information objects access in order to determine how to run appropriately for that site. In an embodiment, the collection of information objects define a standard set of reports for a large retail operation. These reports are designed at the central office, i.e., home site. Each branch store is required to run the report against its own branch database. System aware information objects allow for a 'turnkey' solution in which the reports can run appropriately in the BI system at the store without modification. Because the report is composed of the same information objects at each site, modifications to the report can be made once at the home site and pushed or pulled to each store site. In an embodiment, the system aware information objects are altered at a spoke site. These modifications can be uploaded back to the home site.

Some embodiments of the present invention support system aware information objects that can operate in a mixed version BI system. A BI system administrator may stage the migration of their system to a new newer version in parts. It is advantageous to stage migration in parts for reasons of cost, deployment logistics, and the like. In an embodiment, content (information objects) that are hosted in the previous version of the system can be accessed from a new version of the system. The new version of the metadata is created on the new system when the content is federated from the previous system The data files remain on the previous system and are accessed through the metadata replicated to the new system, Embodiments of the invention include a computer readable storage medium storing executable instructions. In an embodiment, executable instructions include instructions to enable an information object in a BI system for distribution and export of a copy of the information object from the system. The instructions include instructions to define a specification for the information object to make it system aware and to attach the specification to the information object. The specification includes one or more pieces of logic, data, metadata and queries to evaluate values for properties of the information object. In this way the information object's property values change depending on the system it is included in. The instructions provide further definition to the information object, such that it has a first function in a first BI system and a second function in a second BI system. The storage medium can include instructions to create an export entity that includes a property value and a relationship associated with the information object and instructions to export the export entity. In an embodiment, the export entity includes an item from the first system associated with the information object. There can be instructions to determine if the information object has dependencies on another information object.

In a further embodiment of a storage medium comprising executable instructions there are instructions to include metadata and to identify a required information object in the specification of the information object, wherein the information object has a dependency on the required information object.

There can be instructions to include a query term in the specification of the information object. There can be instructions to include a default value in the specification of the information object. The instructions can include executable instructions to receive a request to distribute the information object to the second system. The storage medium can include instructions to receive at the first system a request to send the information object to the second business intelligence system. To service this request, there can be instructions to determine whether to send the information object based on comparing a property of the information object to a piece of data in the request.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to magnetic media such as hard disks, floppy disks, and magnetic tapes optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
   define a first information object, wherein the first information object is operative to perform:
      a first function when associated with a first system, and
      a second function when associated with a second system;
   define a plurality of properties for the first information object, wherein the plurality of properties are divided into:
      a first set of properties for when the first information object is in the first system, and
      a second set of properties when the first information object is in the second system; and transmit the first information object to the second system for execution of the second function at the second system in accordance with the second set of properties.

2. The computer readable storage medium of claim 1 wherein the first information object refers to:
- a second information object when the first information object is in the first system; and
- a third information object when the first information object is in the second system.

3. The computer readable storage medium of claim 1 wherein the plurality of properties of the first information object include one or more properties selected from inheritance, dependency, security, versioning, replication capacity, creation date, change date, object identification (ID), language properties and locale properties.

4. The computer readable storage medium of claim 1 further comprising executable instructions to create an export entity for the first information object.

5. The computer readable storage medium of claim 1 further comprising executable instructions to:
- identify an item associated with the information object;
- combine the information object and the item into a composite export entity; and
- distribute the composite export entity.

6. The computer readable storage medium of claim 1 further comprising executable instructions to:
- identify a parent information object that is coupled to the first information object and from which the first information object depends;
- classify the dependent information object as replicable, wherein a replicable information object is exported with the first information object.

7. The computer readable storage medium of claim 1 wherein the information object defines a part of at least one of a business intelligence (BI) tool, a BI subject, and a BI activity.

8. The computer readable storage medium of claim 1 further comprising executable instructions to assign a default value to a property of the plurality of properties.

9. The computer readable storage medium of claim 1 further comprising executable instructions to:
- create a query that uniquely specifies a non-replicable object in either the first system or the second system; and
- store the query within a property of the plurality of properties.

10. The computer readable storage medium of claim 1 further comprising executable instructions to store metadata within a property of the plurality of properties, wherein:
- the metadata uniquely identifies a non-replicable object in either the first system or the second system, and
- the first information depends on the non-replicable object.

11. The computer readable storage medium of claim 1 further comprising executable instructions to:
- enable the first information object for distribution;
- determine if the first information object has dependencies on an other information object;
- determine if the other information object has dependencies on a further information object;
- create a copy of the information object; and
- export the copy of the information object from the first system.

12. The computer readable storage medium of claim 1 further comprising executable instructions to execute the first information object at the first system to perform the first function in accordance with the first set of properties.

* * * * *